H. F. A. FREVERT.
Harness-Pads.
No. 146,666. Patented Jan. 20, 1874.
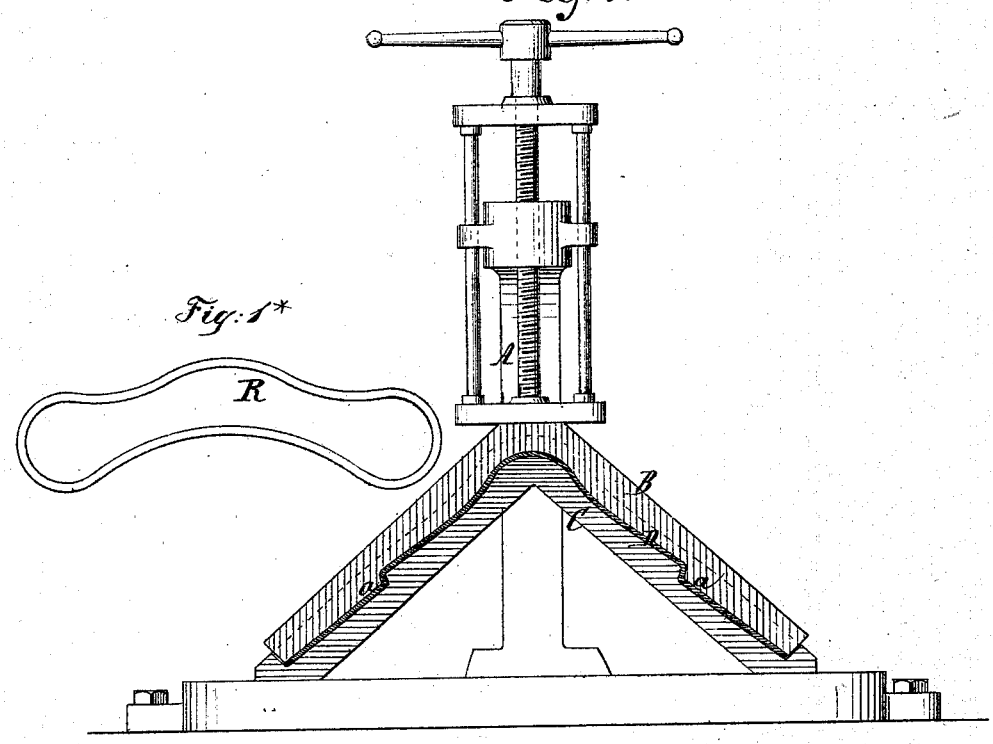
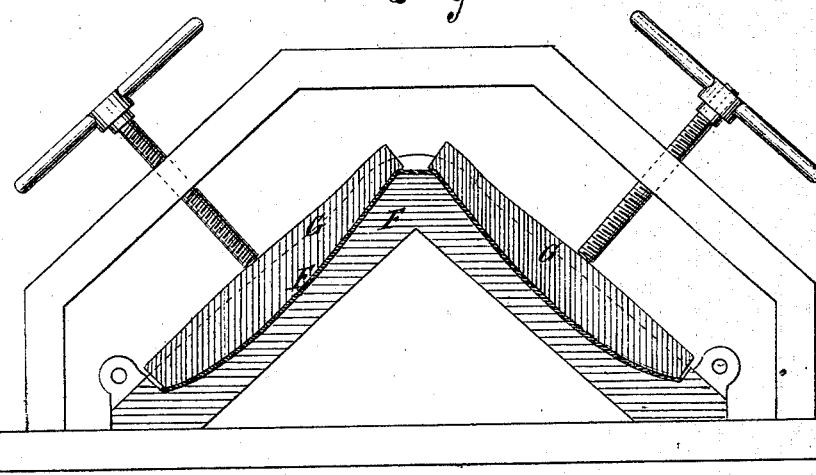
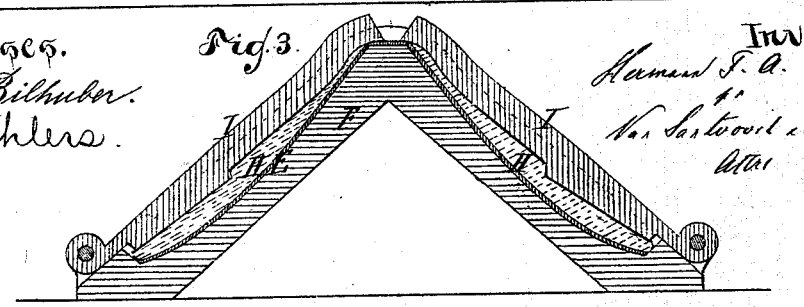

2 Sheets--Sheet 2.

H. F. A. FREVERT.
Harness-Pads.

No. 146,666. Patented Jan. 20, 1874.

Witnesses.
Ernst Bilhuber.
C. Wahlers.

Inventor.
Herman F. A. Frevert
Van Santvoord & Hauff
Attys

UNITED STATES PATENT OFFICE.

HERMANN F. A. FREVERT, OF NEWARK, NEW JERSEY.

IMPROVEMENT IN HARNESS-PADS.

Specification forming part of Letters Patent No. 146,666, dated January 20, 1874; application filed February 14, 1872.

*To all whom it may concern:*

Be it known that I, HERMANN F. A. FREVERT, of Newark, in the county of Essex and State of New Jersey, have invented a new and useful Improvement in Harness-Pads; and I do hereby declare the following to be a full, clear, and exact description thereof, which will enable those skilled in the art to make and use the same, reference being had to the accompanying drawing forming part of this specification, in which drawing—

Figure 5:
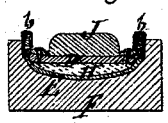
Figure 4:
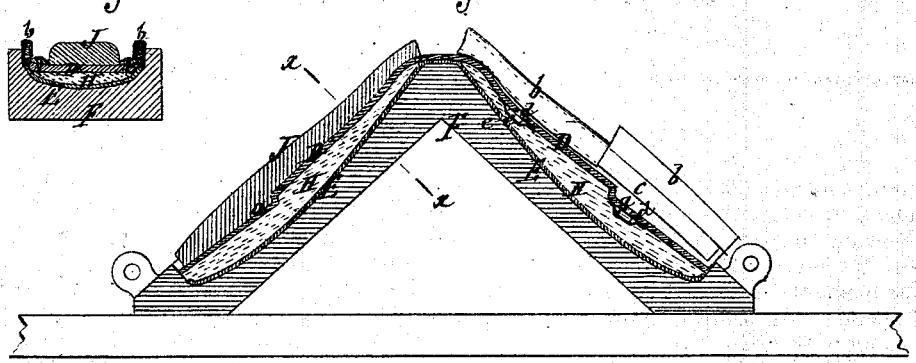
Figure 6:
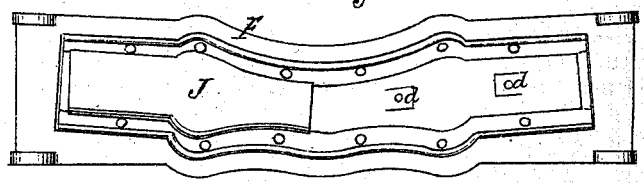
Figure 7:
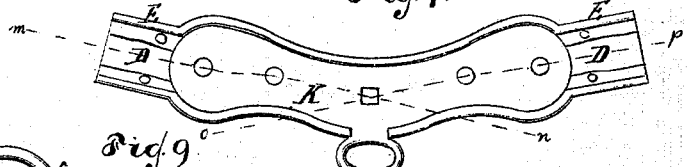
Figure 9:
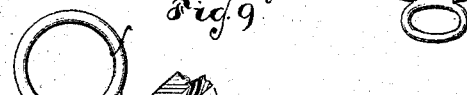
Figure 8:
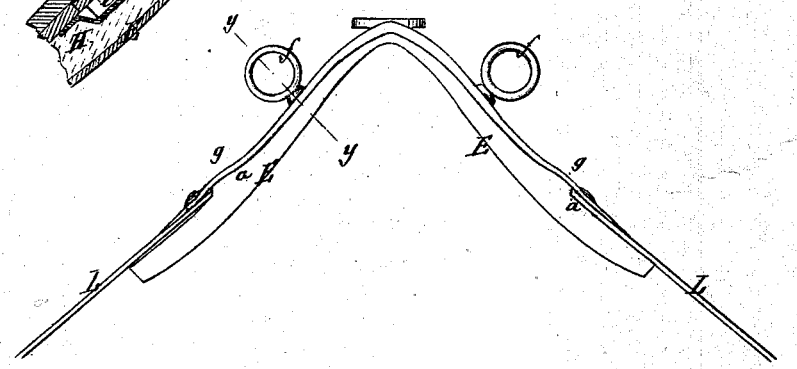

Figure 1 represents a longitudinal section of the apparatus for cutting out and shaping the socket-piece of my harness-pad. Fig. 1* is a plan of the knife. Fig. 2 is a longitudinal section of the apparatus which I use for shaping the pad-leather. Fig. 3 is a similar section of the apparatus which I use for forming the pad-leather previous to the introduction of the socket-piece. Fig. 4 is a similar section of the apparatus used for retaining the socket-piece or pad for the purpose of securing the same together. Fig. 5 is a transverse section of the same in the plane $x\,x$, Fig. 4. Fig. 6 is a plan or top view of the same. Fig. 7 is a plan or top view of my harness-pad complete without the terrets and end screws. Fig. 8 is a sectional side view of the same with the terrets and end screws. Fig. 9 is a transverse section of the same in the plane $y\,y$, Fig. 8.

Similar letters indicate corresponding parts.

This invention relates to a harness-pad, the apex of which is thrown backward, so that the sides of the pad will lie flat and even on the body of the horse. The invention further consists of certain improvements hereinafter described.

In the drawing, the letter A designates a press, which may be used for cutting out the blanks for the socket-piece of my pad, and which I also use for depressing the follower B into the forming-die C, the blank being first moistened, and then adjusted in said die before the follower is put on, so that by the action of said follower the socket-piece D is brought into the desired shape. The knife R, which I use for cutting out the blanks, is shown in Fig. 1*. Its form corresponds to that of the blank, and it is placed under the press, and by the action of the screw-spindle the blank is cut out at once without injuring the cutting-edge of the knife, a piece of rawhide being placed on the platform of the press to preserve said cutting-edge. The blank for the pad-leather E is cut out by means of the knife R, and it is placed on the forming-die F, Figs. 2, 3, and 4, where it is exposed to the action of followers G, which are depressed into the die by screws or other suitable means. (See Fig. 2.) After the pad-leather has been brought in the proper shape, the followers G are removed, the stuffing H is placed on the pad-leather, and then the followers I (see Fig. 3) are brought down upon it, so as to bring the surface of the stuffing in the proper shape for the reception of the socket-piece, said socket-piece being provided with depressions $a$ at its ends, the object of which will be hereafter explained. The followers I are, by preference, hinged to the forming-die F, and they are depressed by means of screws, arranged as shown in Fig. 2, or by any other suitable mechanism. After the socket-piece D has been adjusted on the stuffing H, as shown in Figs. 4 and 5, I place on the socket-piece the followers J, which are somewhat narrower than the socket-piece, (see Figs. 5 and 6,) so that room is obtained for securing the edges of the pad-leather. The followers J are then depressed by means of screws, such as shown in Fig. 2, and the edges of the pad-leather are bent in over the edges of the socket-piece, and fastened thereto by tacks, as shown in Figs. 5 and 6. To the outside of the socket-piece is stitched the binding $b$, and after the edges of the socket-piece are tacked, the binding is bent over in a rise, $c$, and fastened on the inside by means of paste or other suitable cement. In each side of the socket-piece are made two incisions, producing flaps $d$, (see Figs. 6 and 9,) under which are placed the nuts $e$ for the terrets $f$ and the end screws $g$, said flaps being provided with holes for the passage of the screws or of the shanks of the terrets. Beneath the flaps $d$ I form pockets $h$, (see Fig. 9,) to prevent the nuts from getting buried in the stuffing. After the socket-piece has been united with the pad-leather, as above described, I insert the pad-plate K, (see Figs. 7 and 8,) the front end or apex of which is thrown backward, so that the lines $m\,n\,o\,p$, drawn through the flaps or sides of the pad, will intersect each other at an angle of about one hundred and sixty degrees, (see Fig. 7,) and the pad, when ready, will fit the body of the horse.

The pad-plate is cast of iron or other material, and after it has been covered with leather, in the usual manner, it is adjusted on the socket-piece, and secured thereto by the terret and end screw. The leather or top for covering the pad-plate is also cut out by means of a knife and a press. The recesses formed in the ends of the socket-piece serve to admit the ends of the side straps L, (see Fig. 8,) which are retained by the end screws.

By these means a harness-pad is produced which lies conveniently on the back of a horse, and the construction of the pad is materially facilitated.

What I claim as new, and desire to secure by Letters Patent, is—

1. A coach-pad formed substantially as described, its apex being thrown backward in relation to the side flaps, so that lines drawn through their centers in a longitudinal direction will intersect each other at an angle of about one hundred and sixty degrees, as and for the purpose set forth.

2. The follower J, fitting the cavity of the socket-piece D, previously depressed into the die F, said follower, when depressed, leaving room between its edges and the side flanges of the die to allow of securing together the pad-leather and the socket-piece, substantially in the manner described.

3. The flaps $d$ in the socket-piece D, in combination with the nuts for the terrets and end screws, substantially as set forth.

This specification signed this 10th day of February, 1872.

H. F. AUG. FREVERT.

Witnesses:
   W. HAUFF,
   E. F. KASTENHUBER.